July 18, 1967 C. W. LARSON 3,331,920
COLOR INFORMATION DISPLAY AND OPTICAL MEANS
Filed June 2, 1965

INVENTOR
CARL W. LARSON
BY Thomas J. Davenport
ATTORNEY

United States Patent Office 3,331,920
Patented July 18, 1967

3,331,920
COLOR INFORMATION DISPLAY AND
OPTICAL MEANS
Carl W. Larson, Alexandria, Va., assignor, by mesne assignments, to Westinghouse Electric Corporation, Pittsburgh, Pa., a corporation of Pennsylvania
Filed June 2, 1965, Ser. No. 460,729
24 Claims. (Cl. 178—5.4)

This invention relates to a display system wherein information is projected upon a viewing screen by means of an optical system which produces a colored character on the projection screen by subtracting from white light the components thereof which are of a wave length other than the desired, finally projected color. More particularly, the invention relates to a color display system employing a photochromic film in combination with an indicia related source of radiations adapted to excite the photochromic film.

In perhaps the most well known system for displaying colored information on a viewing screen a tinted image carrying the desired information or indicia which is to be projected is placed in the optical path of a source of white light and in passing therethrough light of wave lengths other than the particular tint or color is absorbed and the now selectively filtered light is passed through a series of lenses and is projected upon a viewing screen. In certain applications it is desired to project colored indicia or information upon a screen wherein the information is to be rapidly varied, as in the manner of a moving picture projection system. In such systems, the original information, or the original image, is first photographed and a color-sensitive film is developed, processed, and thereafter wound upon reels for insertion into the projection apparatus. There is thus a considerable time lag between the initial input and recordation of the indicia, information, or other image, and its final projection upon a screen for viewing.

The prior art is aware of information display systems when there is practically no time lag whatsoever between the introduction of rapidly varying information and its projection on a viewing screen and such a system is described in copending application Ser. No. 378,603, filed June 29, 1964, by Philip Ring. Such a system employs a photochromic material and radiations produced by and concomittant with the rapidly varying indicia or information are used to temporarily excite the photochromic film and thereafter white light scans the film and the radiation produced difference in transmissivity of the film is used for projection upon a screen for viewing. Such systems have not been susceptible, in the past, to color projections, and the present invention may be characterized as one which permits the user to obtain the advantages of high speed of such photochromic information display systems as above described, and at the same time, obtain these advantages while admitting of the use of color indicia or information on the viewing screen.

Figure 1:
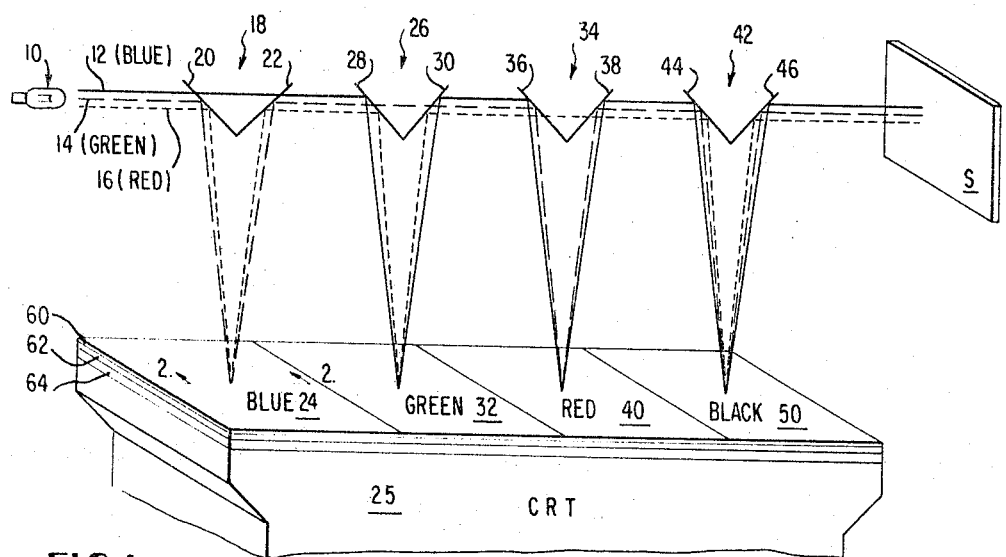
FIGURE 1 is a partially schematic view of the system of the present invention for producing color display on a viewing screen.

Referring now to FIGURE 1 of the drawings, the numeral 10 denotes a source of white light as may be produced by an arc lamp or any other suitable source. As is well known, white light may be considered as the optical summation of several primary colors and the primary colors are often taken as blue, green, and red, i.e., when blue light, green light, and red light are mixed in equal proportions, white light is the result. The numeral 12 denotes a ray of blue light; the numeral 14 denotes a ray of green light; and the numeral 16 denotes a ray of red light. It is understood that after being emitted from the white light source 10, the illustrated parallel rays 12, 14, and 16 may not be seen as colored rays with the naked eye and are illustrated as the three different beams for purposes of clarity and explanation which will follow.

The numeral 18 denotes a first dichroic system comprising two plane dichroic plates 20 and 22. A dichroic plate or a dichroic element in an optical system may be defined as one which will transmit light of a certain frequency or frequencies while reflecting light of another frequency or other frequencies. The dichroic plates 20 and 22 have the characteristic that they transmit light of a wave length corresponding to the color blue, while reflecting other wave lengths. Thus, the numeral 12 denoting the blue component of white light from source 10 passes directly through plates 20 and 22, while the ray 14, corresponding to the wave length denoted by the color green, and the ray 16, corresponding to the wave length denoted by the color red, are both reflected upon striking dichroic plates 20 and 22. The numeral 24 denotes one segment of a cathode ray tube 25 and, with no image on segment 24, the rays 14 and 16 strike the surface 24 and are reflected back, upwardly, to the right dichroic plate 22 in the direction illustrated.

The numeral 26 denotes a second dichroic system and comprises dichroic plates 28 and 30. Plates 28 and 30 have the characteristic that they transmit green light, i.e., they transmit ray 14, while reflecting rays 12 and 16. Upon reflection from left dichroic plate 28, rays 12 and 16 pass to surface 32 of the cathode ray tube 25 and, assuming no image thereon, are reflected back and strike the right dichroic plate 30 for further transmission in the indicated direction.

The numeral 34 denotes a third dichroic system and comprises dichroic plates 36 and 38. Plates 36 and 38 have the characteristic that they transmit those wave lengths denoted by the color red, i.e., ray 16 passes through them while rays 12 and 14 are reflected from the left dichroic plates 36 onto the surface 40 of the cathode ray tube 25. Upon reflection from surface portion 40, assuming no image thereon, rays 12 and 14 strike right dichroic plate 38 for subsequent transmission in the indicated direction.

The numeral 42 denotes an optical system comprising two plane reflecting plates 44 and 46. These plates are similar to a common mirror and reflect light of all wave lengths. Thus, any light striking the left-hand plate 44 is reflected onto surface 50 of the cathode ray tube 25 and, assuming no image thereon, then strikes the right-hand reflecting plate 46 for subsequent impingement upon viewing screen S.

Figure 2:
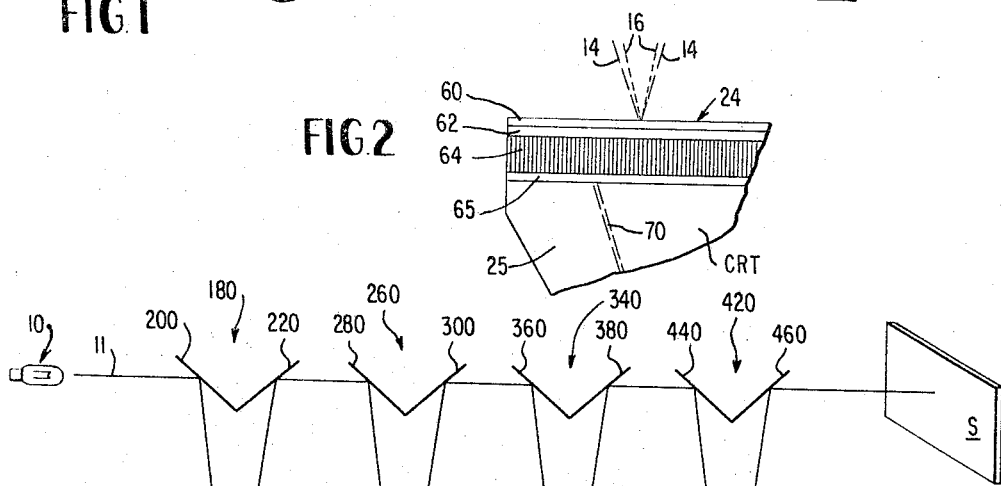
FIGURE 2 is a partially schematic section taken along line 2—2 of FIGURE 1.

Referring now to FIGURE 2 of the drawings, a section of the left-most portion 24 of cathode ray tube 25 is shown, with the numeral 60 denoting a photochromic film. The film 60 extends across the entire face of tube 25 and has the property of temporarily darkening upon excitation by ultra-violet light and, thus, of absorbing light of all wave lengths (colors) at the excited (darkened) portions thereof. The numeral 62 denotes a dichroic plate having the characteristic that all light in the visible part of the spectrum which falls upon its top surface is reflected back, as in the manner of an ordinary mirror, while all ultra-violet light which strikes it passes therethrough. The numeral 64 denotes a fiber optic plate comprised of a plurality of short, internally reflecting tubes whose axes are generally vertical, in FIGURE 2, i.e., whose axes are substantially normal to the surface portions 24, 32, 40, and 50 of the cathode ray tube 25. The numeral 65 denotes a phosphor coating, and the numeral 70 denotes an electron beam whose intensity and spatial orientation, with respect to any of the surface portions of the cathode ray tube 25, are controlled by conventional means well known to workers in this art.

Further with reference to FIGURE 2 of the drawings, an electron beam 70 which strikes the phosphor layer or coating 65 will cause the coating to emit ultra-violet radiation. This radiation is collected at the bottom ends of the individual light tubes which make up fiber optic plate 64, and the ultra-violet light is transmitted to the upper portion, or top, of plate 64, and passes through dichroic plate 62. Assuming the electron beam 70 to be incident on the illustrated portion of the phosphor coating 65, those regions immediately above it on the top of dichroic plate 62 will emit ultra-violet light and this light will excite the photochromic film 60 and cause it to locally darken. Any light which strikes the darkened portion is absorbed, at least to a substantial degree, while any light which is incident upon the film 60 immediately adjacent or surrounding the particular excited portion will be reflected. With this explanation, the reader is now in a position to easily comprehend the operation of the system shown in FIGURE 1 of the drawings.

The source 10 emits white light which may be regarded as a composite of a blue, green, and red light, denoted by the rays 12, 14, and 16, respectively. Assume that it is desired to display a blue character, or blue indicia or information, upon the screen S. The electrical controls for the cathode ray tube 25 are energized in such a manner that the electron beam 70 (see FIGURE 2) strikes the phosphor coating 65 and traces out the desired symbol thereon. This tracing out will cause a certain portion of surface portion 24 of cathode ray tube 25, denoted as BLUE, to darken and to thereby absorb the major portion of the incident green and red rays 14 and 16, respectively, striking the darkened areas of surface 24. Thus, again with reference to FIGURE 2 of the drawings, the incident rays 14 and 16 will strike the photochromic film 60 and will be locally absorbed, i.e., absorbed at those portions which have been traced out by the electron beam 70. The remainder, i.e., the unabsorbed portions of the green and red light, denoted by the upwardly traveling reflected rays 14 and 16 of FIGURE 2, will then strike dichroic plate 22 and pass on in the indicated direction. Since none of the other surface portions 32, 40, or 50 of the cathode ray tube 25 will have been energized by the electron beam 70, there will be a nearly total reflection at surface portions 32, 40, and 50, and the light which now finally impinges upon screen S will represent the original white light from source 10 minus certain portions of the green and red components. These portions which will be missing or lacking will be those portions which have been absorbed by the darkened character (representing the information) at surface portion 24 of the cathode ray tube 25. Thus, the viewer will see the blue character, information, or indicia, at the projection screen S.

In the event that a green character, indicia, or information is desired to be projected on screen S, the same procedure will be followed, with the electron beam 70 now striking the bottom of the cathode ray tube 25 and tracing out a character(s) underneath the GREEN portion 32, to thereby locally subtract, within the outline of the traced out character(s), certain blue and red components from the light which is incident by reflection from dichroic plate 28.

Assume now that it is desired to project a red character, indicia, or information on the screen S. The electron beam 70 will now be directed so as to impinge against the underside of the cathode ray tube 25 at those portions corresponding to portion 40, or the RED portion. A part of the incident blue and green reflected from dichroic plate 36 will be absorbed by the darkened area(s) caused by the incidence of electron beam 70 in tracing out the character(s) and consequent generation of ultra-violet light, and subsequent excitation of photochromic film 60. The final projection upon screen S will represent white light minus a portion of the blue and green components of this white light, and the viewer will see the red character, indicia, or information.

In the event that it is desired to project a black character, indicia, or information upon the screen S, the electron beam 70 is so deflected as to strike the underside of the BLACK portion 50 of the cathode ray tube 25, wherein all of the white light is selectively absorbed at those portions representing the desired character and the final projection upon screen S will be the desired character or indicia.

By the simultaneous excitation of the four portions 24, 32, 40, and 50, each of the different colors which correspond to these surface portions may be projected. Thus, using the sequence NEWS, an N may be traced on portion 24, an E on portion 32, a W on portion 40, and an S on portion 50. The projection on screen S will then show the four sequential letters of the word NEWS in alternating colors for each letter.

It will be understood that the screen S may not be the final viewing screen, but may represent an optical overlay, the construction of which is well known to workers in this art, for further imaging through a projection lens and thence onto a screen for final viewing.

Further, a black character may be projected by simultaneously (as far as the human eye is concerned) tracing out the desired character on homologous portions of any two of the segments 24, 32 and 40. This method would require, with present technology, more complex electron beam (s) controls, since the regions traced out on the two color segments would necessarily be absolutely homologous or corresponding to preclude color fringing of the character on the screen.

The primary colors red, green and blue represent, as earlier set out, those commonly chosen. As will be readily apparent to workers in this art, the dichroic systems 18, 26, and 34 may be chosen to each transmit any other three colors. Further, if the white light source 10 be replaced by a source which emits a plurality of any arbitrary colors, then the dichroic systems (18, etc.) would be chosen corresponding to these arbitrary colors. By way of example, if the white light source 10 were replaced by a source of five distinct colors, then five distinct dichroic systems, such as 18, etc., would be employed with each transmitting a certain one of the five colors and reflecting the remaining four. In such a case, five different colors, in addition to black, could be projected, in the same mode of operation as described above. Thus, while the description of the color information display system of FIGURE 1, as well as the following description of FIGURE 3, has been given in terms of "primary" colors, it is to be understood that in both the description and the claims, other colors may be employed.

Figure 3:
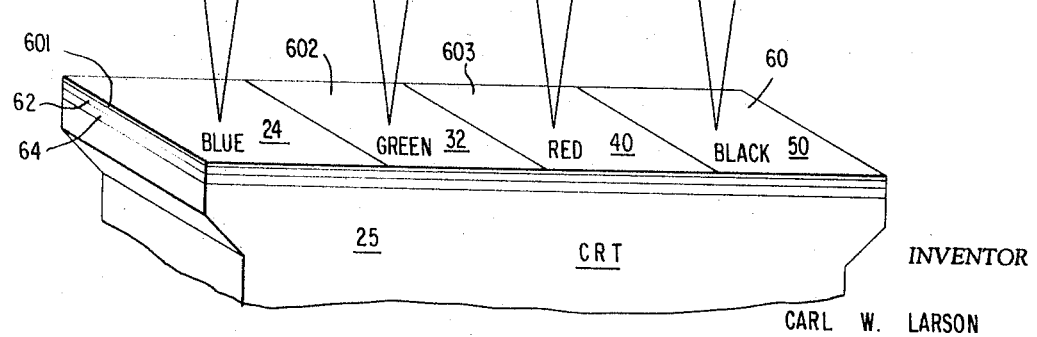
FIGURE 3 is a view similar to FIGURE 1, and showing an embodiment of the invention.

Referring now to FIGURE 3 of the drawings, an embodiment of the invention is illustrated and it will be observed that many of the elements shown in FIGURE 1 are shown again in FIGURE 3. Those elements which are the same in both of these figures are denoted by the same numeral.

In FIGURE 3, the numeral 10 denotes a source of white light which is suitably collected and forms a beam 11 traveling in the indicated direction. The beam 11 of white light may be considered as composed of three convenient primary colors, such as blue, green, and red, and the beam is then centered upon a first plane reflector 200 of a first reflecting system 180. The white light passes downwardly onto portion 24 of cathode ray tube 25. Here, in lieu of the photochromic film 60 which becomes temporarily darkened upon excitation by the ultra-violet radiation from cathode ray tube 25, a segment or portion 601 of a photochromic film is employed. This film segment 601 has the quality of being transparent when unexcited and of absorbing those wave lengths of light corresponding to the colors green and red when excited. It will transmit, however, the color blue when excited. After reflection from portion 24 (assuming no excitation by the cathode ray tube), the white light now strikes plane reflector 220 and passes to plane reflector 280 of a second reflecting system 260. Here, portion 32 of tube 25 is covered with a photochromic film 602 which has the quality of absorbing red and blue when excited and of being transparent when unexcited. It will transmit the color green when excited. Again, assuming no excitation, the light is reflected from portion 32 to plane reflector 300 and thence to plane reflector 360 of a third reflecting system 340. After reflection from the first reflector in the system, the light strikes surface 40 of the tube 25 and this section is covered with a photochromic film 603 which has the quality upon excitation of absorbing the blue and green wave lengths of incident white light, while transmitting those wave lengths denoted by the color red. Again assuming no excitation, the white light is reflected from portion 40 up to reflector 380 and then passes to a plane reflecting element 440 of a final reflecting system 420. After reflection from surface of 440, the incident light is projected on portion 50 which is covered with photochromic film 60, identical to the photochromic film 60 of the embodiment of FIGURE 1. As will be recalled from the description of FIGURE 1, photochromic film 60 has the quality of being transparent when unexcited and of darkening when excited. Again assuming no excitation of portion 50 of the cathode ray tube 25, the light reflected from surface 50 is reflected at reflector 460 and thereafter passes to a viewing screen S.

The mode of operation of this embodiment of the invention is as follows. Assume that it is desired to transmit a blue character on screen S. The controls of the tube 25, by suitable and conventional circuitry, cause the electron beam (see 70 of FIGURE 2) to trace out the desired character, information, or indicia, at portion 24 of the tube 25. This will cause excitation of portion 24 at the localized areas representing the indicia and the green and the red wave lengths from the beam 11 of white light will be absorbed, by virtue of the above-described property of photochromic film portion 601. The light now reflected back from portion 24 will consist of white light from those areas of portion 24 which were not excited by electron beam of tube 25 and of white light minus the green and red wave lengths or components thereof corresponding to those portions 24 which were excited by the electron beam. This light now strikes plane reflector 220 and, recalling that only the blue indicia was required for projection, this light undergoes successive reflections in the indicated path and direction for final viewing at screen S.

Assuming now that a green character, or that green information or indicia is desired to be projected on screen S, the cathode ray tube 25, by suitable and conventional circuitry, traces out the desired character on portion 32 and by virtue of the above-described quality of photochromic film portion 602, the red and blue wave lengths of the white light of beam 11 are absorbed from those portions which have been locally excited and the light reflected from portion 32 now represents white light corresponding to those portions 32 which were unexcited, together with that wave length corresponding to green from the excited portions. The viewer will now see the green information or indicia on the screen S.

Assuming now that a red character, indicia, or information is desired for projection on screen S, the cathode ray tube 25, by conventional and suitable circuitry, is caused to excite and trace out on portion 40 of tube 25 the desired characters. By virtue of the above-described quality of photochromic film portion 603, the blue and green components of the white light beam 11 will be subtracted as the excited portions of film 603 from the incident white light and the light reflected from portion 40 to reflector 380 will represent white light from the unexcited portions of film 603, together with red light corresponding desired characters or information from portion 40. The viewer will now see the red information or characters on screen S.

Assuming now that it is desired to project black information or characters on the screen S, the portion 50 of cathode ray tube 25 powered by suitable and conventional circuitry, is struck by the electron beam and by virtue of the propery of photochromic film 60, all wave lengths of the white light 11 will be absorbed at those localized areas corresponding to the desired character or information and the reflected light from portion 50 will represent the white light incident thereon minus all wave lengths at those portions in the reflected beam which represent the desired character or information. After reflection from plane reflector 460, the viewer will see the black character or information on the screen S.

From the above, it will be seen that the internal construction of the cathode ray tube in FIGURE 3 is identical with respect to the cathode ray tube of FIGURE 1, except for the different photochromic films 601, 602, 603, together with only a portion 60 of the photochromic film which absorbs all wave lengths upon excitation. Further, it will be seen that the embodiment of FIGURE 3 does not require the dichroic systems 18, 26, and 34 of FIGURE 1.

As is the case with the embodiment of FIGURE 1, the embodiment of FIGURE 3 admits of the simultaneous projection of different colors on the final viewing screen. For example, assume that it is desired to project the word NEWS on the viewing screen with alternate primary colors for the first three letters and the last letter in black. The tube 25 would be so energized as to write out the letter N on the portion 24, the letter # on portion 32, the letter W on the portion 40, and the letter S on the portion 50. Different relative positions would be energized on the four areas of the tube 25, corresponding to the spacing between the letters which would be required on the viewing screen S, with the result that a single word would be formed with alternate colors. Obviously, any two colors may be chosen to be the same with the next two the same, and any other desired combinations are possible.

In the description of the embodiments of FIGURES 1 and 3, the surface portions 24, 32, 40, and 50 have been illustrated as lying on different portions of a single cathode ray tube 25. It will be understood that the present invention may be practiced with a single cathode ray tube for each of these surface portions, if desired, and further, the surface portions may be arranged in a square pattern instead of the longitudinal or series relationship with each other as illustrated. In order to facilitate the description of the invention, the various collimating lenses and other optical components of the invention which may be used have not been illustrated. For example, a lens has not been shown directly in front of the white light source 10 to thereby collect it and project it in a parallel beam towards the first optical system 18 (180). The precise location of such optical components is well known to workers in this art and forms no part of the present invention.

I claim:

1. A color information display system including, a source of primary colors adapted to traverse an optical path for projection on a viewing screen, dichroic means in said optical path for selectively transmitting one of said primary colors along said optical path and reflecting the remaining primary colors, a variable indicia related reflecting plane receiving the said reflected primary colors and absorbing them at indicia related portions of the said plane, and means for reintroducing any nonabsorbed, reflected primary colors back into said optical path.

2. The color information display system of claim 1 wherein said reflecting plane includes a photochromic film, said film adapted to undergo optical transmissivity variations upon indicia related radiation incident thereupon.

3. The color information display system of claim 2 wherein said reflecting plane further includes a dichroic mirror which transmits indicia related radiations which excite the photochromic film and which reflects visible light, said dichroic mirror positioned on the side of said film remote from said reflected primary colors.

4. A color information display system including, a source of primary colors adapted to traverse an optical path for projection on a viewing screen, a plurality of dichroic members positioned in said optical path, each of said dichroic members transmitting a different one of the primary colors and reflecting the other primary colors, a variable indicia related reflecting plane associated with such said dichroic member, each reflecting plane receiving the primary colors reflected on it by its associated dichroic member and absorbing them at indicia related portions thereof, and means for reintroducing the non-absorbed, reflected primary colors from each reflecting plane back into said optical path.

5. The color information display system of claim 4 wherein each said reflecting plane includes a photochromic film, said film adapted to undergo optical transmissivity variations upon indicia related radiation incident thereupon.

6. The color information display system of claim 5 wherein each said reflecting plane further includes a dichroic mirror which transmits indicia related radiations which excite the photochromic film and which reflects visible light, said dichroic mirror positioned on the side of said film remote from said reflected primary colors.

7. The color information display system of claim 4 further including a mirror system which reflects all visible light, said system terminally positioned in said optical path and reflecting light incident thereon onto an associated variable indicia related terminal reflecting plane, said reflecting plane absorbing light incident thereon at indicia related portions of said terminal plane, said mirror system reintroducing any non-absorbed, reflected light back into said optical path.

8. The color information display system of claim 7 wherein said terminal reflecting plane includes a photochromic film, said film adapted to undergo optical transmissivity variations upon indicia related radiation incident thereupon.

9. The color information display system of claim 8 wherein said terminal reflecting plane further includes a dichroic mirror which transmits indicia related radiations which excite the photochromic film and which reflects visible light, said dichroic mirror positioned on the side of said film remote from said reflected light.

10. A color information display system including, a source of primary colors adapted to traverse an optical path for projection on a viewing screen, a mirror system which reflects all visible light, said mirror system positioned in said optical path for reflecting light incident thereon onto an associated variable indicia related reflecting plane, said reflecting plane absorbing at least one of the primary colors incident thereon and reflecting all others at variable indicia related portions of said plane, said mirror system reintroducing any non-absorbed, reflected light from said reflecting plane back into said optical path.

11. The color information display system of claim 10 wherein said reflecting plane includes a photochromic film, said film adapted to undergo optical transmissivity variations with respect to less than all of the said primary colors upon variable indicia related radiations incident thereupon.

12. The color information display system of claim 11 wherein said reflecting plane further includes a dichroic mirror which transmits indicia related radiations which excite the photochromic film and which reflects visible light, said dichroic mirror positioned on the side of said film remote from said reflected primary colors.

13. The color information display system of claim 10 wherein said reflecting plane absorbs two primary colors at variable indicia related portions thereof.

14. The color information display system of claim 11 wherein said reflecting plane absorbs two primary colors at variable indicia related portions thereof.

15. The color information display system of claim 12 wherein said reflecting plane absorbs two primary colors at variable indicia related portions thereof.

16. A color information display system including, a source of primary colors adapted to traverse an optical path for projection on a viewing screen, a plurality of mirror systems in said optical path for reflecting light incident thereon onto a variable indicia related reflecting plane associated with each said mirror system, each reflecting plane absorbing at least one of the primary colors incident thereon and reflecting all others at variable indicia related portions of said plane, each of said mirror systems reintroducing any non-absorbed, reflected light from its associated reflecting plane back into said optical path.

17. The color information display system of claim 16 wherein each said reflecting plane includes a photochromic film, said film adapted to undergo optical transmissivity variations with respect to less than all of the said primary colors upon variable indicia related radiations incident thereupon.

18. The color information display system of claim 17 wherein each said reflecting plane further includes a dichroic mirror which transmits indicia related radiations which excite the photochromic film and which reflects visible light, said dichroic mirror positioned on the side of said film remote from said reflected primary colors.

19. The color information display system of claim 16 further including a terminal variable indicia related reflecting plane which absorbs all light incident thereon at indicia related portions of said terminal plane.

20. The color information display system of claim 19 wherein said terminal reflecting plane includes a photochromic film, said film adapted to undergo optical transmissivity variations upon indicia related radiation incident thereupon.

21. The color information display system of claim 20 wherein said terminal reflecting plane further includes a dichroic mirror which transmits indicia related radiations which excite the photochromic film and which reflects visible light, said dichroic mirror positioned on the side of said film remote from said reflected light.

22. A color information display system including a source of primary colors adapted to traverse an optical path for projection on a viewing screen, a plurality of stations along said optical path, variable indicia related means at each said station for subtracting all but one of said primary colors traversing said optical path, the colors subtracted at each said station being different from each other.

23. The color information display system of claim 22 wherein said means includes a dichroic element in said optical path, said dichroic element transmitting one primary color and reflecting all others.

24. The color display system of claim 22 wherein said means includes a mirror which reflects all colors incident thereon.

References Cited
UNITED STATES PATENTS 2,645,976 7/1953 Goldsmith 178—5.2
3,215,030 11/1965 Jordan 350—174

JOHN W. CALDWELL, *Acting Primary Examiner.*

J. A. O'BRIEN, *Assistant Examiner.*